United States Patent
Flake

(10) Patent No.: US 8,078,773 B2
(45) Date of Patent: Dec. 13, 2011

(54) OPTIMIZED TRANSMISSION OF SIGNALS BETWEEN A DISK DRIVE CONTROLLER AND A MOTOR CONTROLLER USING A SERIAL PORT

(75) Inventor: Lance Leslie Flake, Longmont, CO (US)

(73) Assignee: Broadcom Corporation, Irvine, CA (US)

( * ) Notice: Subject to any disclaimer, the term of this patent is extended or adjusted under 35 U.S.C. 154(b) by 1471 days.

(21) Appl. No.: 11/391,862

(22) Filed: Mar. 29, 2006

(65) Prior Publication Data

US 2008/0004825 A1    Jan. 3, 2008

(51) Int. Cl.
G06F 5/00     (2006.01)
G06F 15/16    (2006.01)

(52) U.S. Cl. .......................................... 710/58; 709/248
(58) Field of Classification Search .................... 710/58; 709/248

See application file for complete search history.

(56) References Cited

U.S. PATENT DOCUMENTS

| | | | |
|---|---|---|---|
| 4,926,415 A * | 5/1990 | Tawara et al. ................ 370/231 |
| 5,721,648 A | 2/1998 | Phan et al. |
| 6,131,138 A * | 10/2000 | Packer et al. ................. 711/4 |
| 6,496,319 B1 * | 12/2002 | Kusumoto et al. ............. 360/75 |
| 6,614,618 B1 | 9/2003 | Sheh et al. |
| 6,802,035 B2 * | 10/2004 | Catreux et al. ............... 714/746 |
| 6,924,953 B2 | 8/2005 | Fish et al. |
| 7,106,537 B1 * | 9/2006 | Bennett ........................ 360/69 |
| 2003/0206556 A1 * | 11/2003 | Garcia et al. ................. 370/474 |
| 2005/0036466 A1 * | 2/2005 | Malik et al. .................. 370/338 |

* cited by examiner

*Primary Examiner* — Henry Tsai
*Assistant Examiner* — Juanito Borromeo
(74) *Attorney, Agent, or Firm* — McAndrews, Held & Malloy, Ltd.

(57) ABSTRACT

Herein described are at least a method and a system for prioritizing the transmission of one or more types of signals through a serial port. Various aspects of the present invention may be implemented using a serial port interface module that facilitates communication between any two devices. In a representative embodiment, the two devices comprise a disk drive controller and a disk drive motor controller used in a hard disk drive. In a representative embodiment, the method and the system are used in the hard disk drive for prioritizing the transmission of multirate voice coil motor (VCM) updates and other asynchronous data signals between the disk drive controller and disk drive motor controller through the serial port.

24 Claims, 6 Drawing Sheets

OPTIMIZED TRANSMISSION OF SIGNALS BETWEEN A DISK DRIVE CONTROLLER AND A MOTOR CONTROLLER USING A SERIAL PORT

RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The performance of a hard disk drive is dependent on the positional accuracy of a digital servo controlled motor controller. The motor controller is used to position the read/write heads (or transducers) as its corresponding spindle motor rotates the magnetic disk media. In addition to the spindle motor, the motor controller may utilize a voice coil motor for positioning the read/write heads over the disc surfaces until the heads are positioned over the desired track. The servo controlled motor controller may utilize the positional information embedded in the servo sectors of a track to position or reposition the heads, as the magnetic disk media continuously rotates. Typically, this positional information is sampled once per servo sector. Accordingly, positional adjustments may be made once per servo sector.

When a serial port is used in the hard disk drive to transmit positional updates to a voice coil motor (VCM) of its motor controller, its ability to adjust its heads may be affected by any delay or interruption that prevents a positional update from reaching the VCM. The delay or interruption may be attributed to data transmissions that are unrelated to repositioning the read/write head using servo sector positional information. Such delays or interruptions may result in significant "jitter" of the read/write head of the hard disk drive, resulting in poor hard disk drive performance. Ultimately, this jitter may generate read and/or write errors during operation of the hard disk drive.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Various aspects of the present invention are used to prioritize the transmission of signals between a disk drive controller and its motor controller through a serial port. The various aspects are substantially as shown in and/or described in connection with at least one of the following figures, as set forth more completely in the claims.

These and other advantages, aspects, and novel features of the present invention, as well as details of illustrated embodiments thereof, will be more fully understood from the following description and drawings.

DETAILED DESCRIPTION OF THE INVENTION

Figure 1:
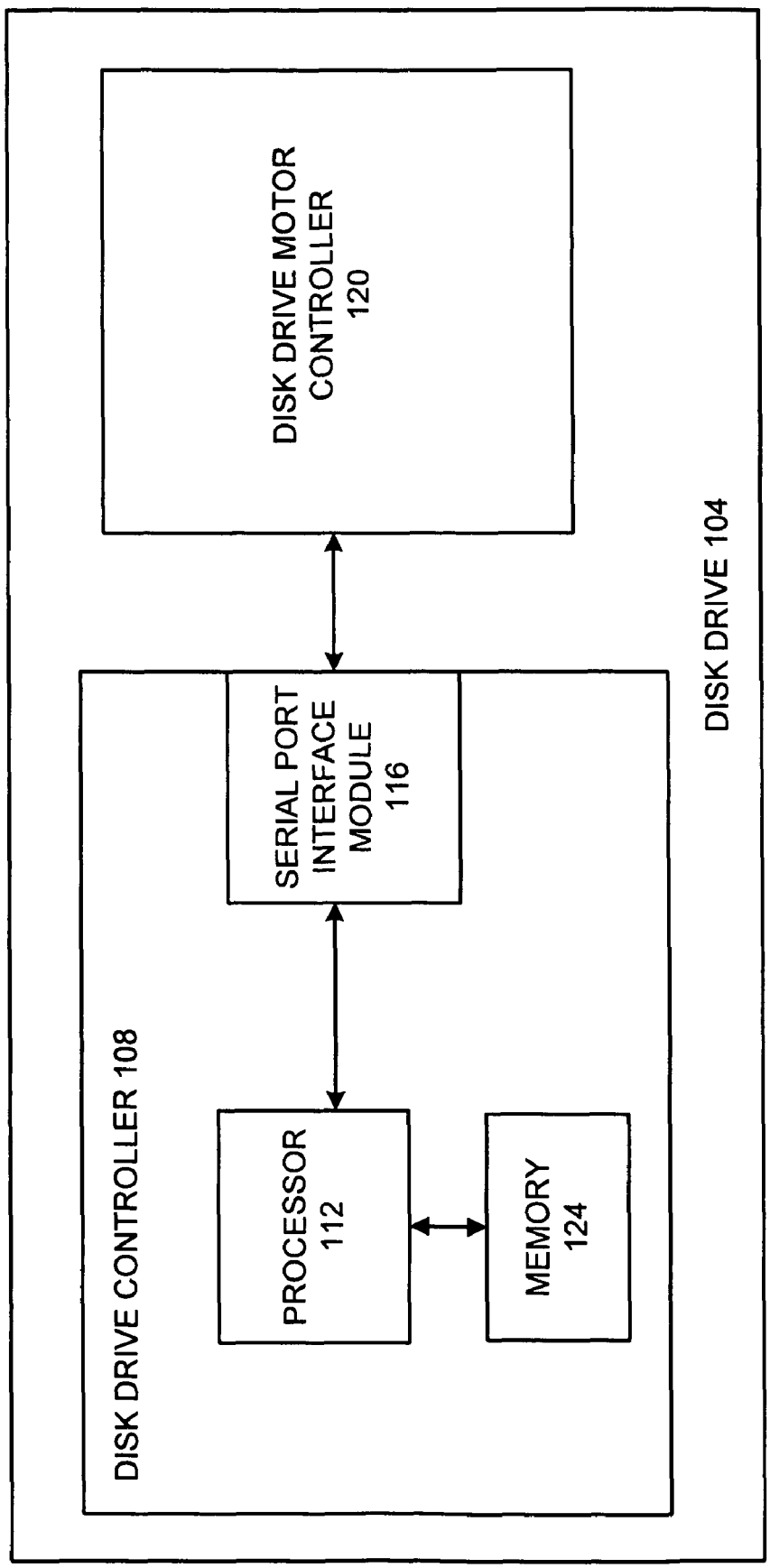
FIG. 1 is a functional block diagram of a disk drive used to prioritize and/or arbitrate transmission of signals through a serial port, in accordance with an embodiment of the present invention.

The present invention is related to a method and system for prioritizing the transmission of one or more types of signals through a serial port. Various aspects of the present invention may be implemented using a serial port interface module that facilitates communication between any two devices. In a representative embodiment, the method and system are used within a magnetic hard disk drive for prioritizing the transmission of multirate servo loop voice coil motor (VCM) updates through the serial port. The multirate updates are generally used to reposition a read/write head relative to a magnetic disk media, for example. Aspects of the present invention may be employed in a closed loop system that utilizes positional information that is embedded in one or more servo sectors of a track of one or more tracks in a magnetic disk media of a magnetic hard disk drive, for example. The positional information obtained from each servo sector may be processed by the closed loop system, to yield the VCM updates. The closed loop system may employ one or more algorithms for computing the VCM updates, for example. In a preferred representative embodiment of the present invention, the VCM updates may be transmitted at a rate that is a multiple of the rate (i.e., multirate) in which the servo sector positional data is being read, such that the read/write head may be more accurately repositioned between successive servo sectors. Hence, one servo sector period may comprise multiple VCM updates or multiple VCM update periods.

In a representative embodiment, multirate VCM updates are transmitted between a disk drive controller to a disk drive motor controller using a serial port interface module. The serial port interface module may be used to prioritize and/or arbitrate the transmission of one or more signals between the disk drive controller and the disk drive motor controller. In a representative embodiment, the serial port interface module comprises a serial port. The serial port may be implemented using logic circuitry. In a representative embodiment, the disk drive controller may comprise the serial port interface module. The disk drive motor controller comprises a voice coil motor. The serial port interface module may comprise associated hardware and/or software that support the prioritized use of the serial port for the transmission or communication of one or more types of signals between the disk drive controller and the disk drive motor controller. The serial port interface module may comprise any logic circuitry or electronics that implements a serial port in accordance with the various aspects of the present invention. In a preferred embodiment, the multirate VCM updates have priority access to the use of the serial port when transmitting data between the disk drive controller and disk drive motor controller. To perform the multirate VCM updates, one or more data command signals may be transmitted from the disk drive controller to the disk drive motor controller by way of the serial port interface module, for example.

Various aspects of the present invention allow the multirate VCM updates to have a higher transmission priority over other types of signals such as asynchronous signals that are transmitted using the serial port in the serial port interface module. If the various aspects of the present invention are not implemented, a multirate VCM update may be interrupted or delayed by an asynchronous signal such that a positional adjustment of a read/write head may not be made in a timely manner, resulting in noticeable jitter. For example, the various aspects of the present invention allow one or more signals that may be used to control the spindle motor of the disk drive motor controller to be transmitted if the one or more signals do not interfere with a scheduled VCM update. In another instance, the various aspects of the present invention allow the multirate VCM updates to have a higher transmission priority over other asynchronous signals, such as one or more signals related to the control and feedback of temperature related information using a temperature sensor incorporated within the disk drive motor controller, for example.

FIG. 1 is a functional block diagram of a disk drive 104 used to prioritize and/or arbitrate transmission of signals through a serial port, in accordance with an embodiment of the present invention. The disk drive 104 comprises a disk drive controller 108 and a disk drive motor controller 120. The disk drive controller 108 comprises a processor 112, a serial port interface module 116, and a memory 124. The processor 112 may comprise any digital circuitry capable of executing firmware, software, and/or any type of executable instructions or code. The memory 124 may comprise any type of memory used to store the firmware, software, instructional code and/or commands. For example, the memory 124 may comprise a random access memory. The serial port interface module 116 comprises a serial port used for transmitting one or more types of signals between the disk drive controller 108 and the disk drive motor controller 120. The processor 112 may be used to execute firmware and/or software that are stored in the memory 124. As a result of executing the firmware and/or software, one or more computations and/or algorithms may be employed in generating multirate VCM updates. Additionally, execution of the firmware and/or software may facilitate prioritization and arbitration in the transmission of one or more multirate VCM update signals and other asynchronous signals between the disk drive controller 108 and the disk drive motor controller 120 through the serial port interface module 116. Further, the prioritization and arbitration of the one or more signals may be additionally facilitated by the processor 112, memory 124, and/or circuitry present within the serial port interface module 116, as will be described subsequently using FIG. 2.

Figure 2:
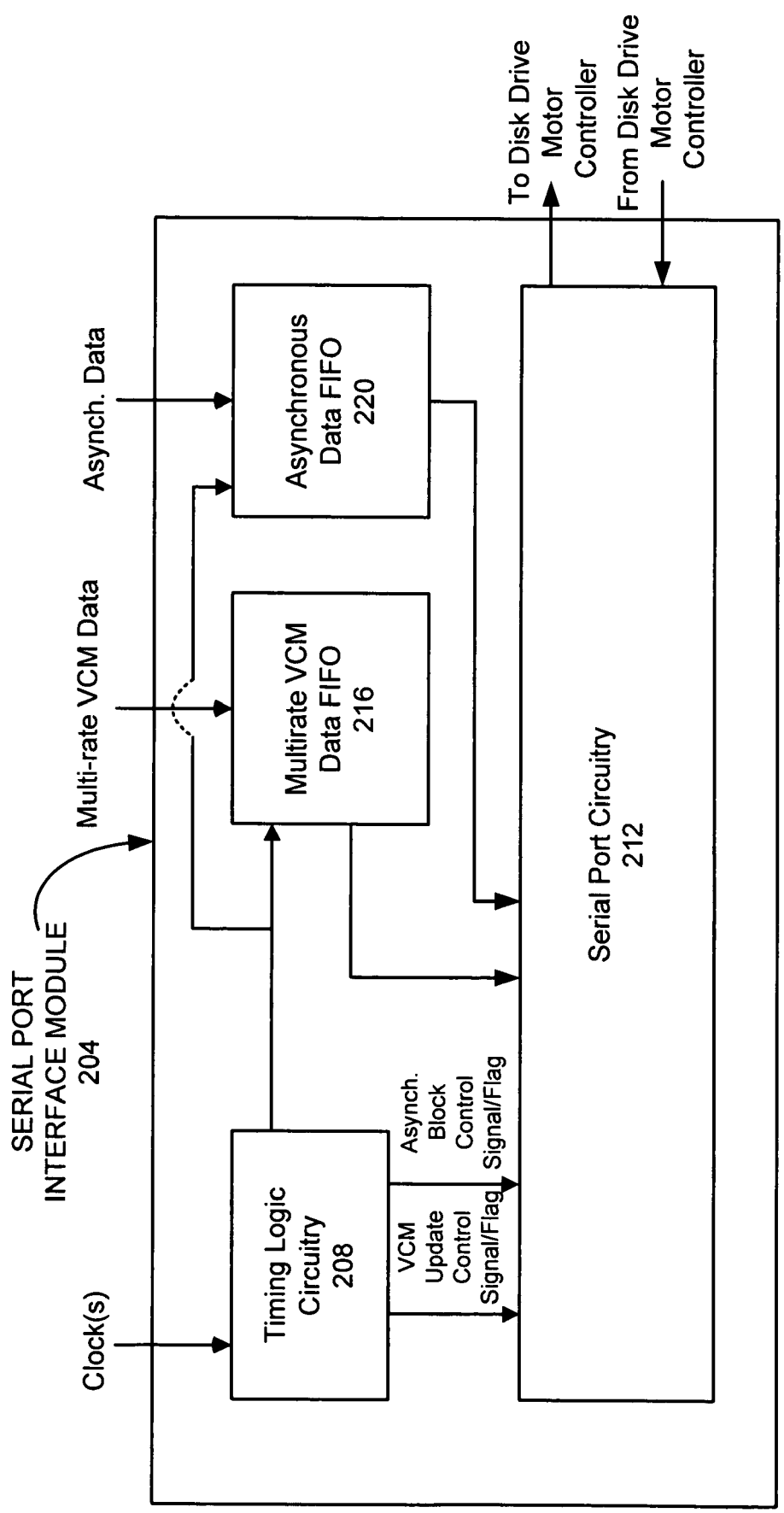
FIG. 2 is a functional block diagram of a serial port interface module used to prioritize and/or arbitrate transmission of signals between a disk drive controller and a disk drive motor controller, in accordance with an embodiment of the present invention.

FIG. 2 is a functional block diagram of a serial port interface module 204 used to prioritize and/or arbitrate transmission of signals between a disk drive controller and a disk drive motor controller, in accordance with an embodiment of the present invention. The serial port interface module 204 may reside within a disk drive controller 108 as was previously described in reference to the embodiment of FIG. 1. The serial port interface module 204 comprises a timing logic circuitry 208, a serial port circuitry 212, a multirate voice coil motor (VCM) first-in-first-out buffer (FIFO) 216, and an asynchronous data first-in-first-out buffer (FIFO) 220. As illustrated, multirate voice coil motor (VCM) data is input to the multirate VCM data FIFO 216. Similarly, asynchronous data is input into the asynchronous data FIFO 220. The serial port circuitry 212 communicates with the disk drive motor controller (not shown). The serial port circuitry 212 comprises the necessary logic circuitry used to implement a serial port for transmitting data between the disk drive controller and disk drive motor controller. The serial port circuitry 212 may comprise a state machine, for example. One or more clocks are input into the timing logic circuitry 208. In a representative embodiment, the one or more clocks may comprise a clock used to increment a counter (not shown). The counter may be used to measure the elapsed time between multirate VCM updates (i.e., the elapsed time in one period of multirate VCM updates). The output of the counter may be compared to a first programmable value using a comparator, for example, such that the comparator outputs a control signal indicating when the counter output equals the first programmable value. The first programmable value may comprise a count corresponding to one period of a multirate VCM update, for example. In a representative embodiment, the one or more clocks may comprise a clock used as a synchronization mechanism to synchronize one or more flip-flops. This may occur to synchronize data processing to suit another frequency/time domain in the serial port interface module. In another instance, the output of the counter may be compared to a second programmable value that is used to signify a count in which non-multirate VCM update signals or asynchronous data transmissions should be restricted until the end of one multirate period, for example. Any asynchronous communications are inhibited when the output of the counter equals the second programmable value, for example. Asynchronous communications may commence when, for example, after all multirate data commands are transmitted at the start of a new multirate period. The timing logic circuitry 208 may output one or more control signals or flags to the serial port circuitry 212. As illustrated in the exemplary embodiment, the timing logic circuitry 208 outputs a VCM update control signal/flag and an asynchronous block control signal/flag to the serial port circuitry 212. The VCM update control signal/flag may be used as a signal to the multirate VCM data FIFO 216 and serial port circuitry 212 to initiate the start of a VCM update. The VCM update control signal/flag may be generated based on the frequency of multirate VCM updates employed by a disk drive controller, such as, for example, the disk drive controller previously described in reference to FIG. 1. The asynchronous block control signal/flag may be used as a signal to the asynchronous data FIFO 220 and serial port circuitry 212 to restrict or inhibit the transmission of any non-multirate VCM update signal, hereinafter referred to as asynchronous data signals. The timing logic circuitry 208 may provide timing signals to the multirate VCM data FIFO 216 and the asynchronous data FIFO 220, to appropriately clock one or more data signals and/or commands to the serial port circuitry 212. Each of the one or more data commands may comprise VCM update data used by the VCM to reposition a read/write head relative to a rotatable disk media. The multirate VCM data FIFO 216 may transmit one or more command signals to the disk drive motor controller using the serial port circuitry 212 during a multirate VCM update. On the other hand, the asynchronous data FIFO 220 may transmit one or more asynchronous data signals to the disk drive motor controller using the serial port circuitry 212 when the serial port circuitry 212 is not involved in a multirate VCM update.

Figure 3:
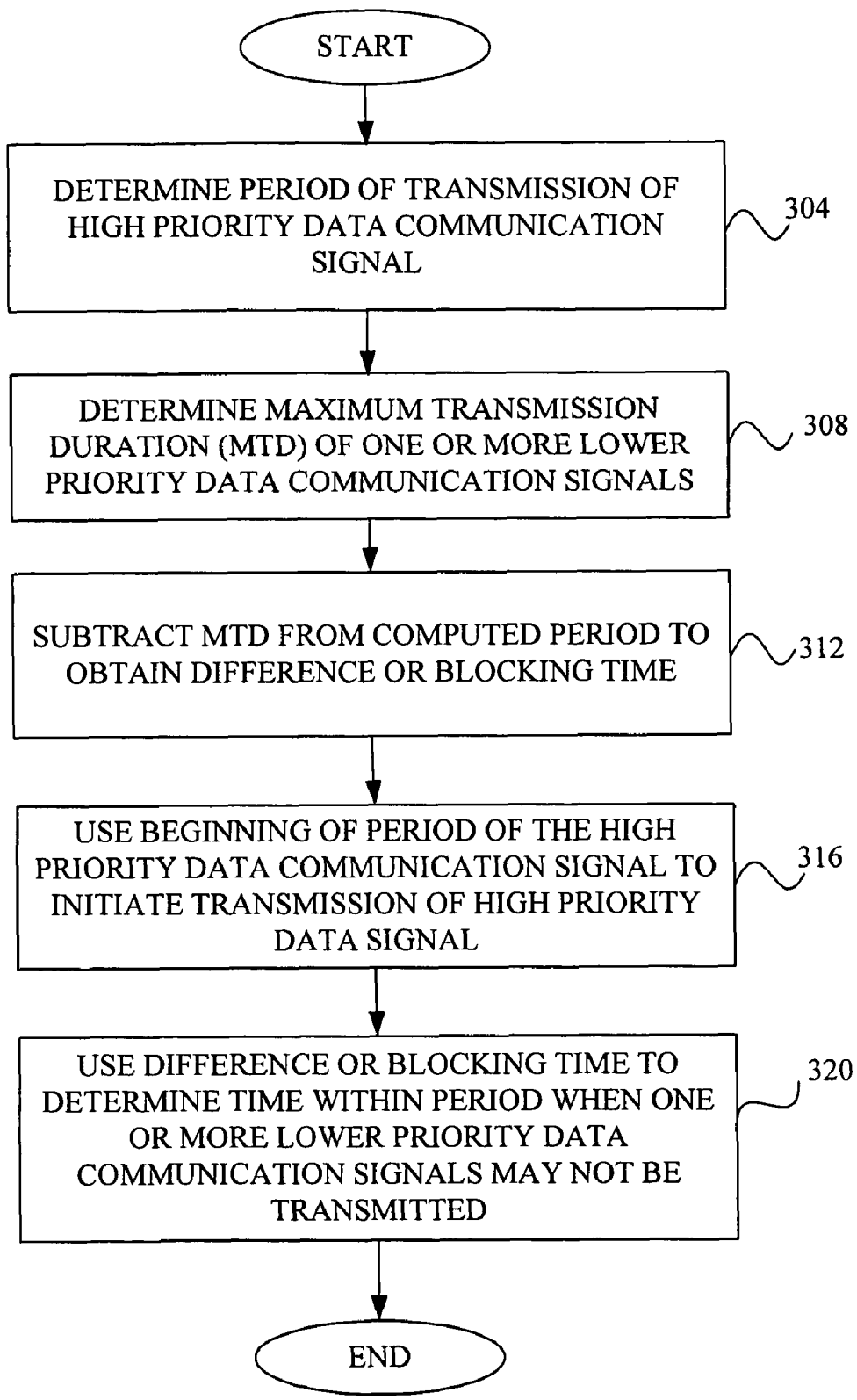
FIG. 3 is an operational flow diagram of a method used for optimizing the transmission of signals using a serial port, in accordance with an embodiment of the present invention.

FIG. 3 is an operational flow diagram of a method used for optimizing the transmission of signals using a serial port, in accordance with an embodiment of the present invention. The method may be applied to any type of serial port communication that requires sharing between a high priority periodic function and other asynchronous functions. At step 304, a frequency (or period) of a high priority function is determined. The high priority function may comprise transmitting a data communications signal periodically while the low priority function may comprise transmitting one or more other asynchronous command signals, for example. The data communications signal may comprise a data command signal. The data command signal may comprise any type of data and one or more control flags, for example. The data lengths may be programmable by a user of the present invention. In a representative embodiment, the data length of a data command signal may comprise up to 32 bits. Next, at step 308, the maximum transmission duration (MTD) of the other asynchronous functions is determined. For example, the other asynchronous functions may comprise the transmission of one or more low priority command signals. At step 312, the MTD is subtracted from the period determined in step 304 to obtain a difference value or "blocking time". At step 316, the beginning or start of the data command signal's period may be used to initiate transmission of a data command signal. In a representative embodiment, it is contemplated that the duration of the data command signal is a small percentage of the period. Next, at step 320, the difference value or blocking time is used to determine the time when the one or more asynchronous command signals may not be transmitted. The difference value or blocking time is used to prevent any additional non-high priority data communications signals from being transmitted when a high priority data communications signals is to be transmitted.

Figure 4:
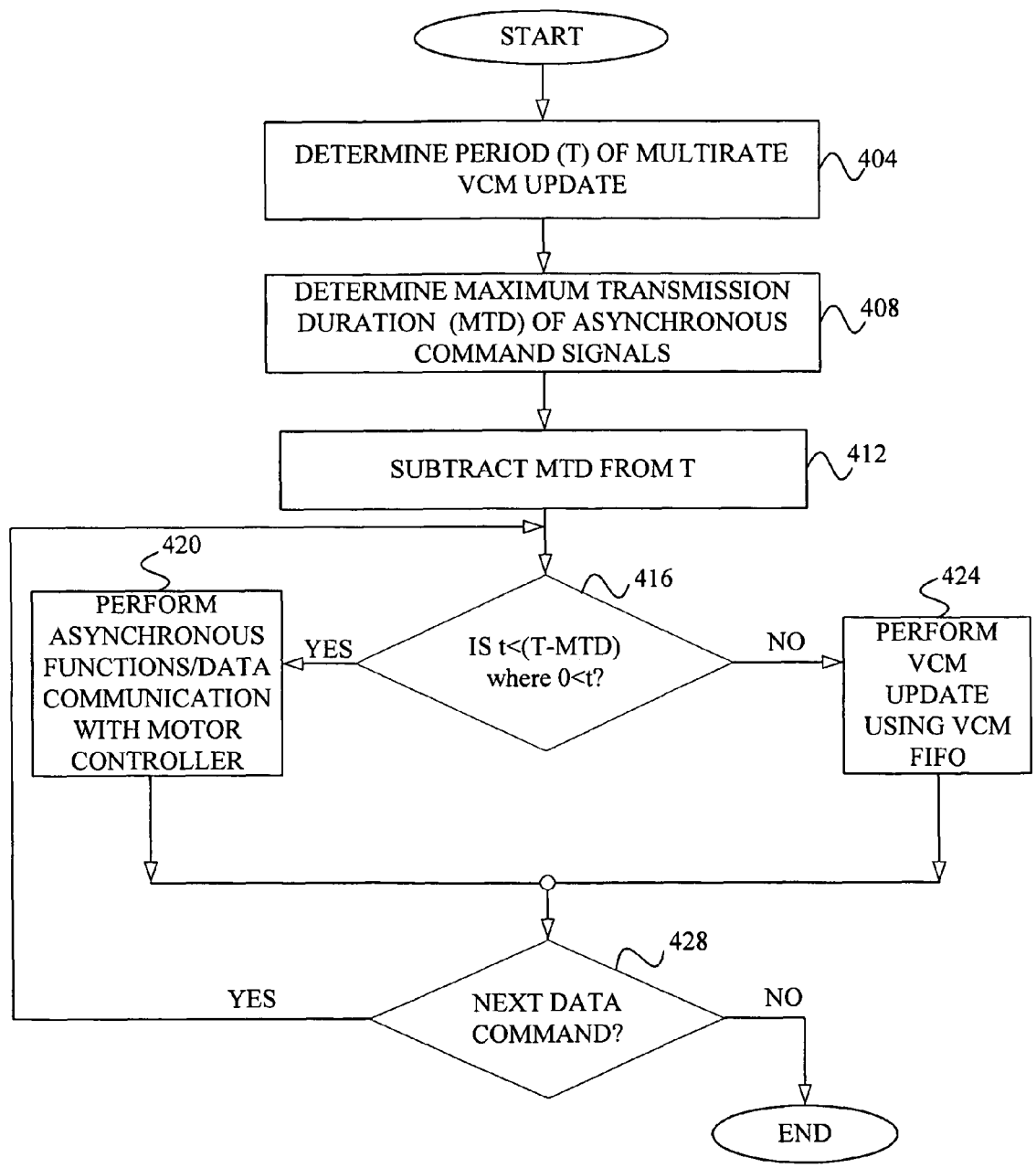
FIG. 4 is an operational flow diagram of a method used to optimize the transmission of signals using the serial port interface module previously described in relation to FIG. 3, as applied to multirate VCM updates in a magnetic hard disk drive, in accordance with an embodiment of the present invention.

FIG. 4 is an operational flow diagram of a method used to optimize the transmission of signals using the serial port interface module previously described in relation to FIG. 3, as applied to multirate VCM updates in a magnetic hard disk drive, in accordance with an embodiment of the present invention. In reference to FIG. 3, the high priority data communications signal may correspond to a multirate voice coil motor (VCM) signal. Again referencing FIG. 3, the MTD is determined by computing the length of time corresponding to the transmission of the longest group of asynchronous functions. These asynchronous functions may correspond to one or more asynchronous data communication (or command) signals used in the hard disk drive. The MTD may be determined by executing firmware and/or software stored in a memory of the disk drive controller, for example. At step 404, the period (T) of transmission of the multirate VCM updates is determined. The value of T may be determined by way of a programmable value stored in the memory, for example. Next, at step 408, the maximum transmission duration (MTD) of the asynchronous command signals is determined. Thereafter, at step 412, the MTD is subtracted from T. The difference may be termed or referred to as a difference value or blocking time. At step 416, it is determined if the time within the period is less than this difference value or blocking time. The time may be determined by way of the count output by the counter described in reference to FIG. 2, for example. The counter may be reset every multirate period (T), for example. If t is less than the blocking time, then the process proceeds to step 420, in which one or more asynchronous command signals may be transmitted. Otherwise, the process proceeds with step 424, at which a multirate VCM update is performed. It is contemplated that the multirate VCM update consumes a short period of time relative to T, such that there is time for transmitting asynchronous command signals through the serial port. Next, at step 428, a decision is made whether a command signal waits to be processed. If an additional command signal is in queue to be processed, the process reverts to step 416. The additional command signal may comprise either a multirate VCM update command signal or an asynchronous command signal. In a representative embodiment of the present invention, a flag may be generated to notify the serial port circuitry (previously described in reference to FIG. 2) when the difference value or blocking time has been reached. Likewise, another flag may be generated at a frequency based on the multirate VCM update or sampling frequency. These flags may be generated by way of executing the firmware and/or software stored in the memory of the disk drive controller, for example. These flags may be used by the serial port circuitry that was previously described in reference to FIG. 2, for example.

Figure 5A:
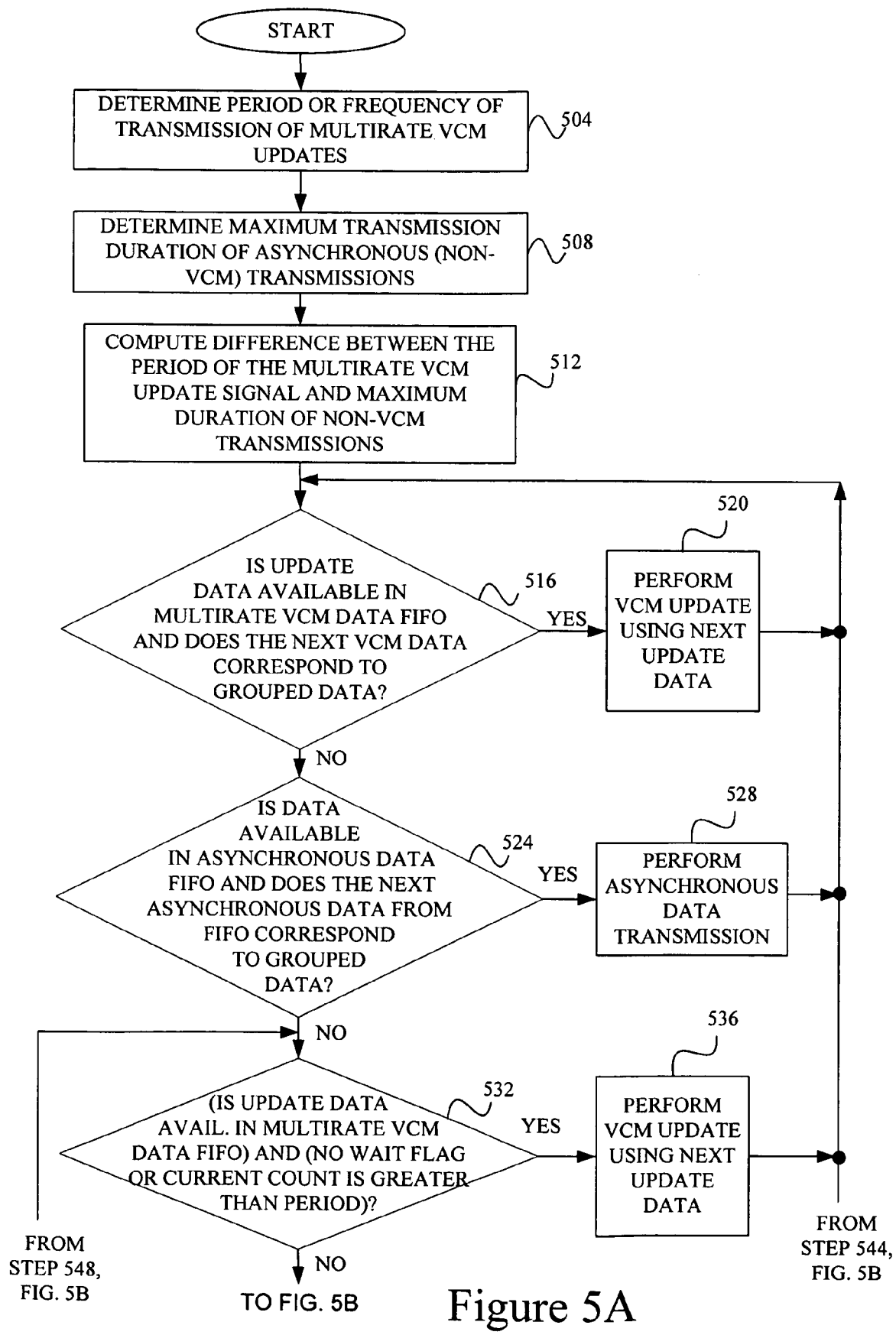
FIGS. 5A and 5B correspond to an operational flow diagram illustrating a method for optimizing use of a serial port when multirate voice coil motor (VCM) updates and other asynchronous signal transmissions are transmitted between a disk drive controller and a disk drive motor controller via the serial port, in accordance with an embodiment of the present invention.
Figure 5B:
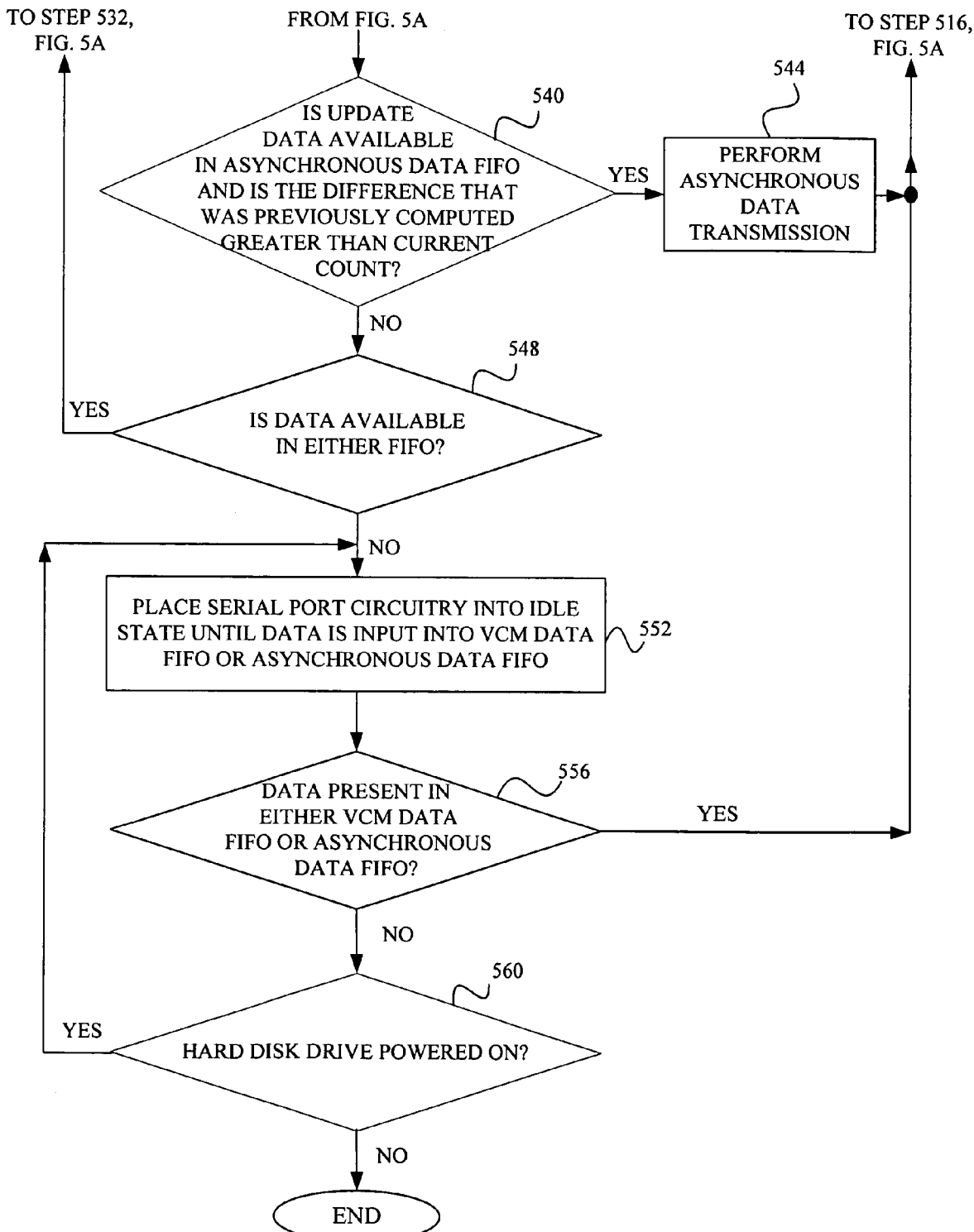

FIGS. 5A and 5B correspond to an operational flow diagram illustrating a method for optimizing use of a serial port when multirate voice coil motor (VCM) updates and other asynchronous signal transmissions are transmitted between a disk drive controller and a disk drive motor controller via the serial port, in accordance with an embodiment of the present invention. The operational flow diagram illustrated in FIGS. 5A and 5B may correspond to the functional block diagrams illustrated in FIGS. 1 and 2. At step 504, the period (T) or frequency of transmission of multirate voice coil motor (VCM) updates may be determined. This period (T) may be predetermined by the firmware and/or software or by a value stored in memory of the disk drive controller. Next at step 508, the maximum transmission duration (MTD) of asynchronous (non-VCM) transmissions may be determined. The MTD may be determined by executing the firmware and/or software resident in the memory. The firmware and/or software may be used to implement one or more algorithms used to compute the MTD, for example. Next at step 512, the difference between the period and MTD may be computed. This difference value (or blocking time) may be saved in the memory of the disk drive for future computations. At step 516, a decision may be made as to whether two conditions are satisfied: 1) VCM update data is available in a multirate VCM data FIFO (as was previously described in reference to FIGS. 2) and 2) the next VCM update data (i.e., the next data command) in the multirate VCM data FIFO corresponds to grouped data, for example. Grouped data herein refers to successive data commands that need to be transmitted successively or consecutively through the serial port. The grouped data may comprise a first VCM update command followed by second or subsequent multirate VCM update command, for example. The grouped data may have commands that are linked or dependent between each other. For example, if a multirate VCM update requires grouped data transmission using two commands, a first multirate VCM update command would be followed immediately thereafter with a second multirate VCM update command. The first and second multirate VCM update commands must be sent consecutively and cannot be interrupted by an asynchronous command. As a consequence, grouped data may be placed at the highest priority level when processing data commands stored in the multirate VCM data FIFO or asynchronous data FIFO. If, at step 516, both conditions are satisfied, the process proceeds with step 520, at which a VCM update may be performed using the next update data (i.e., a second or subsequent multirate VCM update command of the group of multirate VCM commands is processed). The next update data may be provided by the multirate VCM data FIFO described in reference to FIG. 2. Otherwise, the process proceeds with step 524. At step 524, another decision is made as to whether two conditions are satisfied: 1) asynchronous data is available in an asynchronous data FIFO and 2) the next asynchronous data (i.e. next asynchronous command) in the asynchronous FIFO corresponds to grouped data, for example. If, at step 524, both conditions are satisfied, the process proceeds with step 528, at which an asynchronous data transmission is performed using the next asynchronous data (i.e., a second or subsequent asynchronous command of the group of asynchronous commands is processed). The next asynchronous data may be provided by the asynchronous data FIFO described in reference to FIG. 2. If, on the other hand, one or more conditions of step 524 are not satisfied, the process proceeds with step 532. At step 532, another decision is made as to whether the following conditions are satisfied: 1) multirate VCM update data is available in the multirate VCM data FIFO and 2) there is nowait flag or the count of a counter (such as the counter described in reference to the timing logic circuitry of FIG. 2) is greater than the multirate VCM update period (T), for example. The wait flag may be incorporated within a multirate VCM command signal, for example. In a representative embodiment, a wait flag is not generated until after the first multirate VCM update is performed. Hence, given a first multirate VCM update value stored in the multirate VCM data FIFO, the process proceeds to step 536. After the first multirate VCM update is performed, the wait flag is set during processing of all subsequent multirate VCM update values in a servo sector period. As a consequence, the count of the counter must be greater than the multirate VCM period (T) in order for subsequent multirate VCM updates to be transmitted within the same servo sector period. In this representative embodiment, the wait flag is removed (or is not set) at the start of a subsequent servo sector period, for example. If, at step 532, the conditions are satisfied, the process proceeds with step 536, at which a VCM update may be performed using the next update data (i.e., the next multirate VCM update command in the multirate VCM update FIFO). If, on the other hand, one or more conditions of step 532 are not satisfied, the process proceeds with step 540. At step 540, another decision is made as to whether two conditions are satisfied: 1) update data is available in the asynchronous data FIFO and 2) the difference value previously computed at step 512 is greater than the count or output of a counter, such as the counter described in reference to the timing logic circuitry of FIG. 2, for example. If, at step 540, both conditions are satisfied, the process proceeds with step 544, at which an asynchronous data transmission is performed using the next asynchronous data (i.e., next asynchronous command) provided by the asynchronous data FIFO. Otherwise, the process proceeds with step 548. At step 548, an assessment is made whether any data exists in either the multirate VCM data FIFO or the asynchronous data FIFO. If data exists in either FIFO, the process reverts back to step 532, FIG. 5A. Otherwise, the process proceeds with step 552. At step 552, the serial port circuitry is placed in an idle state until either the multirate VCM data FIFO or asynchronous data FIFO receives data. Next, at step 556, an assessment is made whether data is present in either the multirate VCM data FIFO or asynchronous data FIFO. If data exists in either FIFO, the process reverts to step 516, FIG. 5A. Otherwise, the process continues at step 560, at which it is determined whether the disk drive is powered on. If the disk drive is turned on or powered on, the process reverts back to step 552. Otherwise, the process ends. As illustrated in FIGS. 5A and 5B, upon the completion of any of steps 520, 528, 536, 544, the process continues thereafter at step 516.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention is not to be limited to the particular embodiments disclosed, but that the invention will include all embodiments falling within the scope of the appended claims.

What is claimed is:

1. A method for transmitting data over a serial port comprising:
    determining a period of transmission of a first data signal through said serial port;
    determining a maximum transmission duration of a second data signal through said serial port;
    computing a difference between said period and said maximum transmission duration;
    initiating transmission of said first data signal at a specified time; and
    restricting transmission of said second data signal from said specified time to until said difference has elapsed, wherein said first data signal comprises a multirate voice coil motor update, said update based on positional information obtained from one or more servo sectors.

2. The method of claim 1 wherein said second data signal comprises other asynchronous data.

3. The method of claim 2 wherein said asynchronous data is used for controlling a spindle motor in a disk drive motor controller.

4. The method of claim 2 wherein said asynchronous data is used for controlling temperature using a temperature sensor in a disk drive motor controller.

5. A method of transmitting multirate update signals between a disk drive controller and a disk drive motor controller of a hard disk drive comprising:
    determining a maximum transmission duration of one or more asynchronous transmissions, said asynchronous transmissions not comprising said multirate update signals;
    computing the difference between a period of said multirate update signals and said maximum transmission duration to yield a difference value;
    transmitting multirate voice coil motor (VCM) data provided by said multirate update signals to said disk drive motor controller from said disk drive controller, said transmitting started at a specified time; and
    restricting transmission of said one or more asynchronous transmissions until said difference value has elapsed after said specified time.

6. The method of claim 5 wherein said multirate VCM data comprises a command signal containing one or more flags.

7. The method of claim 6 wherein said transmitting multirate VCM data to said disk drive motor controller occurs when a flag of said one or more flags is set.

8. The method of claim 5 wherein said multirate VCM data comprises grouped data.

9. The method of claim 5 wherein said one or more asynchronous transmissions comprises grouped data.

10. The method of claim 5 wherein said period is determined by comparing a count provided by a counter to a programmable value stored in a memory.

11. The method of claim 8 wherein said grouped data comprises successive multirate VCM update commands.

12. The method of claim 8 wherein said grouped data comprises successive asynchronous commands.

13. A hard disk drive comprising:
one or more circuits operable for, at least:
determining a period of transmission of a first data signal through a serial port;
determining a maximum transmission duration of a second data signal through said serial port;
computing a difference between said period and said maximum transmission duration;
initiating transmission of said first data signal at a specified time; and
restricting transmission of said second data signal from said specified time to until said difference has elapsed, wherein said first data signal comprises a multirate voice coil motor update, said update based on positional information obtained from one or more servo sectors.

14. The hard disk drive of claim 13 wherein said second data signal comprises other asynchronous data.

15. The hard disk drive of claim 14 wherein said asynchronous data is used for controlling a spindle motor in a disk drive motor controller.

16. The hard disk drive of claim 14 wherein said asynchronous data is used for controlling temperature using a temperature sensor in a disk drive motor controller.

17. A hard disk drive comprising:
one or more circuits operable for, at least:
determining a maximum transmission duration of one or more asynchronous transmissions, said asynchronous transmissions not comprising multirate update signals;
computing the difference between a period of said multirate update signals and said maximum transmission duration to yield a difference value;
transmitting multirate voice coil motor (VCM) data provided by said multirate update signals to a disk drive motor controller from a disk drive controller, said transmitting started at a specified time; and
restricting transmission of said one or more asynchronous transmissions until said difference value has elapsed after said specified time.

18. The hard disk drive of claim 17 wherein said multirate VCM data comprises a command signal containing one or more flags.

19. The hard disk drive of claim 18 wherein said transmitting multirate VCM data to said disk drive motor controller occurs when a flag of said one or more flags is set.

20. The hard disk drive of claim 17 wherein said multirate VCM data comprises grouped data.

21. The hard disk drive of claim 17 wherein said one or more asynchronous transmissions comprises grouped data.

22. The hard disk drive of claim 17 wherein said period is determined by comparing a count provided by a counter to a programmable value stored in a memory.

23. The hard disk drive of claim 20 wherein said grouped data comprises successive multirate VCM update commands.

24. The hard disk drive of claim 20 wherein said grouped data comprises successive asynchronous commands.

* * * * *